(12) United States Patent
Ramer (10) Patent No.: US 7,979,904 B2
(45) Date of Patent: Jul. 12, 2011

(54) METHOD, SYSTEM AND PROGRAM PRODUCT FOR MAXIMIZING VIRUS CHECK COVERAGE WHILE MINIMIZING REDUNDANCY IN VIRUS CHECKING

(75) Inventor: Steven J. Ramer, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 1125 days.

(21) Appl. No.: 11/682,938

(22) Filed: Mar. 7, 2007

(65) Prior Publication Data

US 2008/0222177 A1    Sep. 11, 2008

(51) Int. Cl.
*G06F 11/00*    (2006.01)
*G06F 12/16*    (2006.01)

(52) U.S. Cl. ............ 726/24; 726/22; 726/26; 726/25; 726/23; 380/269

(58) Field of Classification Search .......... None
See application file for complete search history.

(56) References Cited

U.S. PATENT DOCUMENTS

| | | | |
|---|---|---|---|
| 5,857,072 A * | 1/1999 | Crowle | 709/203 |
| 2003/0074573 A1 * | 4/2003 | Hursey et al. | 713/200 |
| 2003/0115479 A1 * | 6/2003 | Edwards et al. | 713/200 |
| 2004/0236884 A1 | 11/2004 | Beetz | |
| 2005/0172337 A1 * | 8/2005 | Bodorin et al. | 726/22 |
| 2005/0278783 A1 * | 12/2005 | Chien et al. | 726/22 |
| 2007/0067844 A1 * | 3/2007 | Williamson et al. | 726/24 |
| 2008/0222215 A1 * | 9/2008 | Bai et al. | 707/202 |

* cited by examiner

*Primary Examiner* — Nasser Moazzami
*Assistant Examiner* — Fikremariam Yalew
(74) *Attorney, Agent, or Firm* — Yee & Associates, P.C.; Arthur J. Samodovitz (57) ABSTRACT

A method, system and program product for maximizing virus check coverage, while minimizing redundancy in virus checking. The method includes evaluating, using an audit checking tool, whether or not a file in a working directory to be virus checked is a compressed file and, if the file is evaluated as being a compressed file, decompressing the compressed file evaluated using a decompression tool. Further, the method includes iterating the evaluating and decompressing steps to decompress any other files contained therein using the decompression tool and deleting a respective compressed file that is fully decompressed by the decompression tool without any errors from the working directory, while saving a respective compressed file that is not fully decompressed by the decompression tool. Furthermore, the method includes virus checking the working directory, such that, the virus checking does not virus check the respective compressed file that is deleted from the working directory.

14 Claims, 4 Drawing Sheets

FIG. 4

METHOD, SYSTEM AND PROGRAM PRODUCT FOR MAXIMIZING VIRUS CHECK COVERAGE WHILE MINIMIZING REDUNDANCY IN VIRUS CHECKING

FIELD OF THE INVENTION

The present invention relates to a method, system and computer program product for maximizing virus check coverage while minimizing redundancy when virus checking compressed files in a directory. In particular, the present invention relates to a method, system and computer program product for maximizing virus check coverage while minimizing redundancy when virus checking compressed files in a directory, using an audit checking tool to preprocess compressed files in the directory before virus checking the files in the directory.

BACKGROUND OF THE INVENTION

Businesses develop and distribute many different types of software for many different operating systems. Before distributing to customers the software and documentation files, a business often performs various audits, such as, virus checking of the software and documentation files. Given that some files may or may not be compressed and given that some files may be targeted for a particular operating system, while other files may be targeted for multiple operating systems, makes it increasingly difficult to virus check such different types of files using a single virus scanner, especially if the files to be virus checked include different types of compressed files. As such, there is a need for a business to provide a cost-effective way to develop ways to effectively and efficiently virus check files with a greater percentage of the files being virus checked, but without being computationally intensive and without being time consuming and overly redundant.

SUMMARY OF THE INVENTION

In a first aspect of the invention, there is provided a method for maximizing virus check coverage while minimizing redundancy in virus checking. The method includes evaluating, using an audit checking tool, whether or not a file in a working directory to be virus checked is a compressed file and, if the file is evaluated as being a compressed file, decompressing the compressed file evaluated. Further, the method includes iterating the evaluating and decompressing steps to decompress any other files contained therein, deleting a respective compressed file that is fully decompressed from the working directory and virus checking the working directory; wherein the virus checking does not virus check the respective compressed file that is deleted. In an embodiment, the iterating step further includes establishing whether an object in the file in the working directory is another file or another directory. If the object is established to be another directory, invoking the decompression tool to decompress the another directory in the working directory. If the object is established to be another file, determining whether or not the another file is another compressed file and if the another file is determined to be the another compressed file, invoking the decompression tool to decompress the another compressed file in the new directory. The method further includes ascertaining whether or not there are any errors associated with decompressing the respective compressed file that is fully decompressed by the decompression tool. If any errors are not ascertained, deleting the respective compressed file that is fully decompressed from the working directory and if any errors are ascertained, saving the respective compressed file in the working directory. Further, the virus checking step further includes invoking a virus scanning tool to virus check all files in the working directory, the working directory including the new directory. In an embodiment, the decompression tool includes a command line decompression tool, and wherein the virus scanning tool includes a command line virus scanning tool.

In another aspect of the invention, there is provided a system for efficient and effective virus checking of compressed files in a directory. The system includes a file in a working directory in a system to be virus checked, the file including 0 to N directories and including 0 to N files. Further, the system includes a decompression tool configured to decompress into a new directory 0 to N compressed files contained within the file in the working directory, the new directory being a subset of the working directory and an audit checking tool configured to recursively preprocess the file in the working directory using the decompression tool to decompress the 0 to N compressed files in the new directory, the audit checking tool being further configured to delete a respective compressed file among the 0 to N compressed files that has been ascertained to be completely decompressed by the decompression tool without any errors. Furthermore, the system includes a virus scanning tool configured to virus check the working directory that has been recursively preprocessed by the audit checking tool using the decompression tool to decompress the 0 to N compressed files; wherein virus checking of the respective compressed file that has been deleted is precluded. In an embodiment, the audit checking tool is configured to establish whether an object in the working directory is another file or another directory, if the object is established to be the another directory, invoking the decompression tool to decompress the another directory in the working directory, if the object is established to be the another file, determining whether or not the another file is compressed and if the another file is determined to be compressed, invoking the decompression tool to decompress the another file into the new directory. In an embodiment, the audit checking tool is further configured to ascertain whether or not there are any errors associated with decompressing by the decompression tool the respective compressed file and to delete the respective compressed file from the working directory, if any errors are not ascertained. In an embodiment, the audit checking tool is further configured to save the respective compressed file in the working directory if it is ascertained that there are errors associated with decompressing the respective compressed file. In an embodiment, the virus scanning tool is further configured to virus check all files in the working directory, the working directory including the new directory. In an embodiment, the decompression tool includes a command line decompression tool; and wherein the virus scanning tool includes a command line virus scanning tool.

In yet another aspect of the invention, there is provided a computer program product for maximizing virus check coverage while minimizing redundancy in virus checking. The computer program product includes a computer readable medium, first program instructions to evaluate whether or not a file in a working directory to be preprocessed for virus checking is a compressed file. The computer program product further includes second program instructions to recursively preprocess the compressed file evaluated by invoking a decompression tool to decompress the compressed file, including any other compressed files contained therein, the second program instructions including instructions to delete from the working directory a respective compressed file that is ascertained as being fully decompressed by the decompression tool without any errors. The computer program product further includes third program instructions to virus check the working directory after the compressed file has been recursively preprocessed using the decompression tool; wherein the virus scanning tool does not virus check the respective compressed file that is deleted from the working directory. In an embodiment, the first program instructions further include instructions to run an audit checking tool for evaluating whether or not the file in the working directory is the compressed file and to invoke the decompression tool for decompressing the compressed file. In an embodiment, the first program instructions further include instructions to establish whether an object in the file in the working directory is another file or another directory, if the object is established to be the another directory, invoking the decompression tool to decompress any files contained within the another directory in the working directory and, if the object is established to be the another file, determining whether or not the another file is another compressed file and if the another file is determined to be the another compressed file, invoking the decompression tool to decompress the another compressed file in a new directory. In an embodiment, the second program instructions further include instructions to ascertain whether or not there are any errors associated with the respective compressed file being fully decompressed by the decompression tool, if any errors are not ascertained, deleting the respective compressed file from the working directory and, if any errors are ascertained, saving the respective compressed file in the working directory. In an embodiment, the third program instructions further include instructions to virus check, using the virus scanning tool, all files in the working directory, the working directory including the new directory. In an embodiment, the decompression tool includes a command line decompression tool; and wherein the virus scanning tool includes a command line virus scanning tool. Preferably, each of the first, second and third program instructions are stored on the computer readable medium.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1:
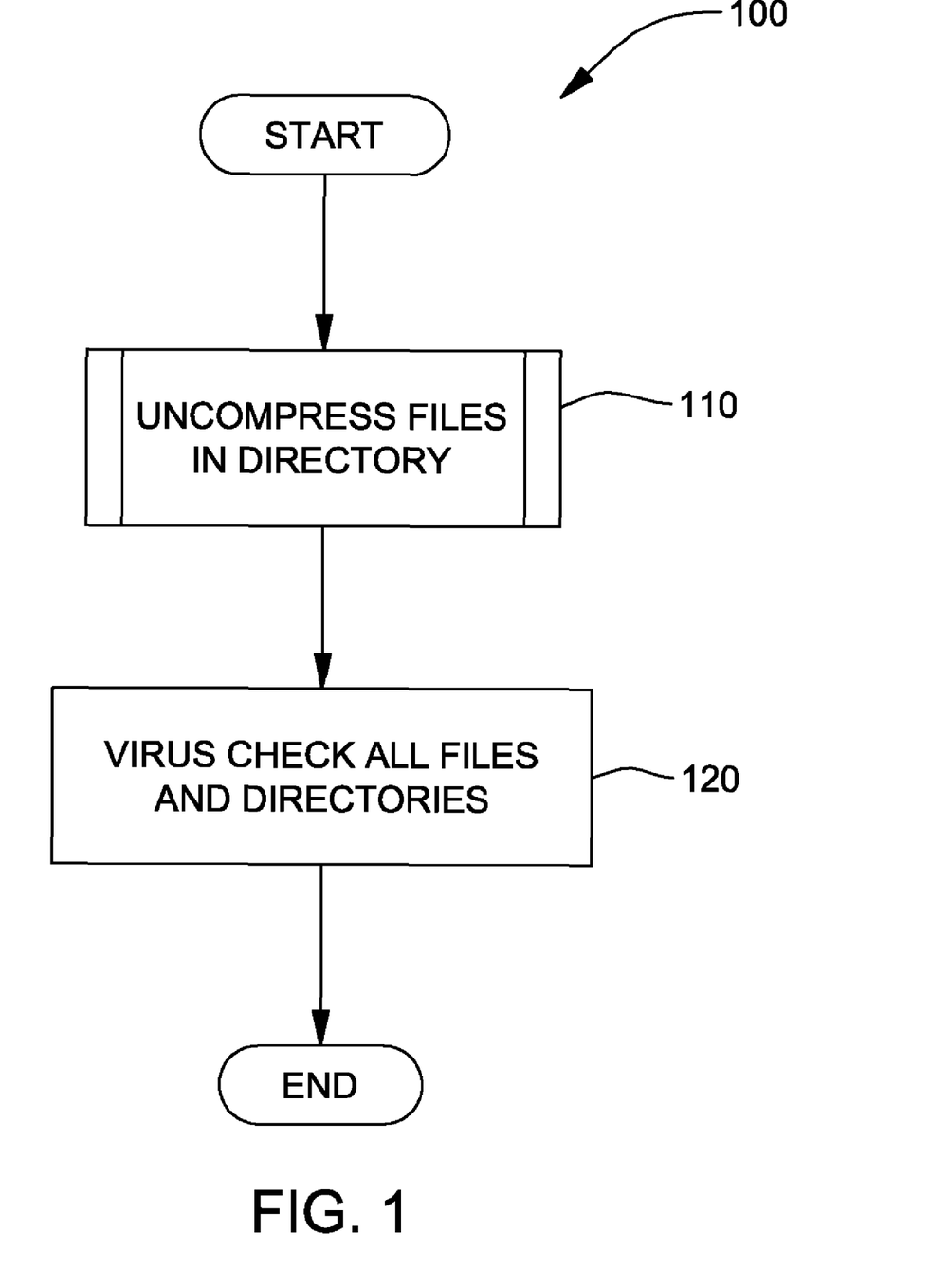
FIG. 1 depicts a flowchart outlining an overall process for maximizing virus check coverage while minimizing redundancy when virus checking compressed files in a directory, using an audit checking tool to preprocess compressed files in the directory, in accordance with an embodiment of the present invention.

In one embodiment, the invention provides a method for maximizing virus check coverage while minimizing redundancy when virus checking compressed files in a directory, as described herein below with respect to FIGS. 1 and 2. Turning to FIG. 1, reference numeral 100 describes an overall process for maximizing virus check coverage while minimizing redundancy when virus checking compressed files in a directory. The process outlined in reference numeral 100 is carried out using an audit checking tool or code that is configured to maximize virus check coverage while minimizing redundancy when virus checking compressed files in a directory.

The audit checking tool is further described herein below with respect to FIGS. 3 and 4. In particular, the audit checking tool preprocesses compressed files in a directory by invoking in step 110 a decompression function "Uncompress Files in Directory", which invokes a decompression tool to uncompress or decompress any compressed files in the directory. The preprocessing of compressed files to decompress or uncompress the files in step 110 will be further described herein below with respect to FIG. 2. Further, after all the compressed files that can be decompressed or uncompressed by the decompression tool have been decompressed or uncompressed in step 110, the audit checking tool invokes a virus scanning tool or virus scanner or anti-virus scanner to virus check in step 120 all the files and directories preprocessed by the audit checking tool, ending the process. Typical virus scanning tool or virus scanners operate based on a combination of checks of files, sectors and system memory. In particular, a virus scanning tool or virus scanner searches files, sectors and/or system memory utilizing a library or database of virus signatures or code sequences characteristics of a given virus to determine if the file, sector and/or system memory searched contains data matching any of the signatures. However, the database or library could include other types of signatures, such as, signatures of other types of harmful malware, that is, any program or piece of code that is loaded on to a computer and/or performs some undesired action on a computer without the knowledge or consent of the owner or operator. In an embodiment, the virus scanning tool is a command line virus scanning tool, for instance, the McAfee® VirusScan Command Line product that is commercially available from McAfee, Inc.

Figure 2:
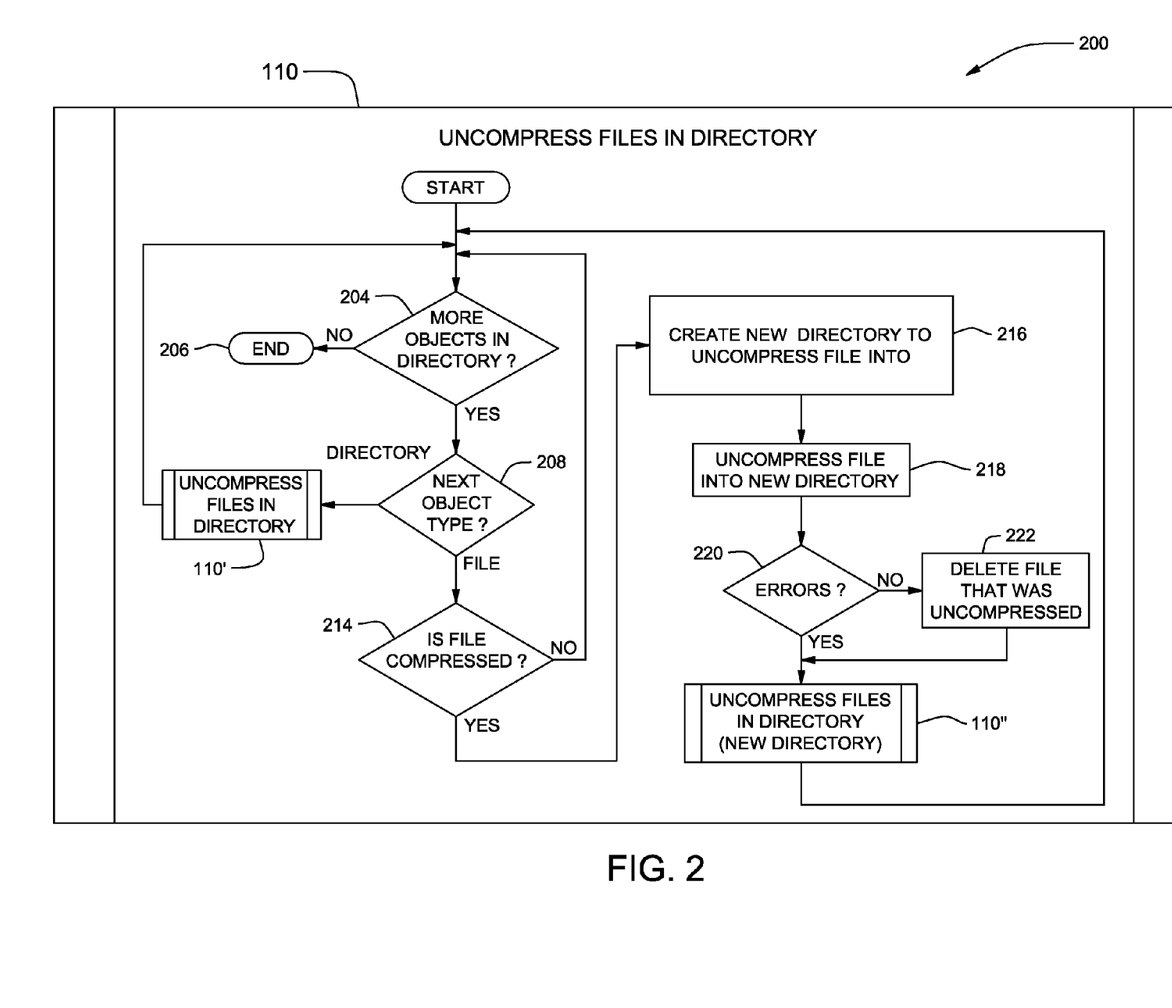
FIG. 2 depicts a flowchart outlining the preprocessing of compressed files in a directory, in accordance with an embodiment of the present invention

Turning to FIG. 2, reference numeral 200 outlines the details carried out by the decompression function "Uncompress Files in Directory" (shown as reference numeral 110 in FIG. 1) for preprocessing compressed files in a directory, using an instance of the decompression function "Uncompress Files in Directory" (also, labeled as step 110 in FIG. 2), which is invoked by the audit checking tool to decompress or uncompress files in a directory, for maximizing virus check coverage while minimizing redundancy in the virus checking of the directory. In an embodiment, the audit checking tool is run on a server, with the audit checking tool being configured to process auditing requests that are received, for instance, from a messaging server. In an embodiment, an auditing request comprises a request to audit or virus check a file or files in a directory. The file or files in the directory are preprocessed in order to maximize virus check coverage of the file(s) by a virus scanning tool. Accordingly, the audit checking tool accesses a directory (containing one or more objects, that is, files and/or directories) that is to be audited for virus checking and, in an embodiment, the audit checking tool creates a temporary or working directory to which the files and/or directories to be audited are transferred into, for instance, over a network to the server on which the audit checking tool is running, so that the audit checking tool can preprocess the directory before virus checking the directory. In an embodiment, the audit checking tool accesses a file in a directory that is to be audited, such as, a CD image file. As such, depending on the type of file that is being audited, the audit checking tool may expand or convert the file before auditing the file. Thus, a CD image file may have to be expanded into the files and directories that compose the CD before auditing the CD image file. Referring to FIG. 2, reference numeral 110 depicts a first instance of the decompression function "Uncompress Files in Directory" invoked by the audit checking tool running on a server for preprocessing files in a working or temporary directory (also referred to as directory or original directory), that is, for decompressing or uncompressing any files in the directory that can be decompressed or uncompressed, using a decompression tool. As such, the process starts in step 204 with the audit checking tool determining whether or not there are more objects, namely, one or more files or one or more directories contained within the original directory that is being preprocessed. If the audit checking tool determines in step 204 that there are no objects (that is, there are no other files and/or directories) in the directory that the audit checking tool is preprocessing, then the preprocessing of the directory ends in step 206 and the audit checking tool invokes the virus scanning tool (step 120 in FIG. 1) to virus check the directory. However, if there are more objects to be preprocessed in the directory that is being preprocessed, then in step 208, the audit checking tool determines the type of object to be preprocessed, that is, whether the object is a file or a directory. The determination of whether the object is a file or a directory is operating system dependent and will vary from one operating system to another. If the audit checking tool determines in step 208 that the object is a directory, then the audit checking tool initiates or starts execution of a new instance of the decompression function "Uncompress Files in Directory" (step designated by reference numeral 110') to preprocess all compressed files within this directory. When this new instance of the decompression function (step 110') finishes running, it returns, and the calling instance of the decompression function (step 110) continues by proceeding to step 204 in order to determine if more objects are to be processed in the directory that it was working on. On the other hand, if the audit checking tool determines in step 208 that the object is a file, then the audit checking tool determines in step 214 whether or not the file is a compressed file. In an embodiment, the audit checking tool invokes the decompression tool to determine whether or not a file is compressed. As such, the determination is dependent on the capabilities of the decompression tool. If the audit checking tool determines in step 214 that the file is not compressed, then the audit checking tool goes back to step 204 and determines whether or not there are any more objects (files and/or directories) in the working directory to be preprocessed. If it is determined that there are no more objects (that is, no other files and/or directories) in the working directory being preprocessed by the first instance of the decompression function "Uncompress Files in Directory" (step 110), invoked by the audit checking tool, then the preprocessing ends in step 206 and the audit checking tool invokes the virus scanning tool (step 120 in FIG. 1) to virus check the directory. However, if the audit checking tool determines in step 204 that there are more objects in the directory to be preprocessed, then the process continues with step 208, where the audit checking tool determines whether the object to be preprocessed is a file or a directory. If the audit checking tool determines in step 208 that the object is a directory, then the audit checking tool initiates or starts execution of another new instance of the decompression function "Uncompress Files in Directory" (step designated by reference numeral 110'), without stopping execution of any other instances of the decompression function that may be still running. On the other hand, if the audit checking tool determines in step 208 that the object is a file, then the audit checking tool determines in step 214 whether or not the file is a compressed file. If the audit checking tool determines in step 214 that the file is not compressed, then the audit checking tool repeats steps 204 through 214 as long as there are objects to be processed within the directory (that is, step 204 indicates that there are more objects to be processed). If the audit checking tool determines in step 214 that the file is compressed, then the audit checking tool creates in step 216 a new directory for decompressing or uncompressing the compressed file into. In an embodiment, the new directory is stored within the working directory, which contains the compressed file that is found in step 214. However, it is understood that the new directory could be stored external to the working directory and not within the working directory. As such, any objects that are decompressed by the decompression tool are stored in the working directory. Further, in step 218, the audit checking tool invokes a decompression tool to decompress the compressed file found in step 214, such that, the decompression tool outputs objects (files and/or directories contained within the compressed file) to the new directory created in step 216. In an embodiment, the decompression tool is any decompression tool that is commercially available in the marketplace, preferably, a command line decompression tool. In essence, the audit checking tool invokes in step 218 a decompression tool to uncompress or decompress objects contained within the compressed file found in step 214 into the new directory created in step 216. In an embodiment, the decompression tool is a command line decompression tool, for instance, the PKZip® product that is commercially available from PKware, Inc.

After the compressed file has been decompressed or uncompressed in step 218, the audit checking tool determines in step 220 whether or not there are any errors found or associated with the decompressing of the compressed file that was carried out by the decompression tool in step 218. If the compressed file is determined to be completely or fully decompressed without any reported errors, then in step 222, the audit checking tool deletes from the working directory the compressed file that was decompressed successfully. However, if the audit checking tool determines that there are errors associated with the decompressing of the compressed file in step 222, such as, the compressed file could only be partially decompressed, then the audit checking tool does not delete the compressed file in the working directory. Further, the audit checking tool initiates or starts execution of yet another instance of the decompression function "Uncompress Files in Directory" (step designated by reference numeral 110") in order to decompress or uncompress all files in the new directory that may be compressed.

Accordingly, referring back to step 214, if a file in the directory is determined to be a non-compressed file in step 214, the file will be left as it is in the directory and the process goes back to step 204 to look at the next object in the directory. Since the file is left as it is in the directory, when the virus check occurs in step 120 of FIG. 1 (that is, after all the preprocessing has been completed in steps 110, 110' and 110" of FIG. 2), it will virus check that file. However, if a file in the directory is determined in step 214 to be a compressed file, an attempt at uncompressing the file is made in step 216 through 222. If the compressed file is decompressed by the decompression tool without any errors, in step 222, the original compressed file is deleted, so that the virus scanning tool will not virus check the original compressed file given that the original compressed file is now deleted (but the uncompressed contents of the compressed file which have been decompressed will be virus checked by the virus scanning tool in step 120). As such, the preprocessing of the files by using the decompression tool provides maximum virus test coverage and an efficient way to virus check the files that have been preprocessed, since the virus scanning tool or virus scanner will not have to check both the original compressed file and its decompressed contents. If the decompression tool had errors decompressing the original compressed file, then it will not be deleted and will still exist in the original directory for the virus scanning tool or virus scanner to scan in step 120, that is, after the preprocessing step 110" has been completed. Since the results of the decompression in step 218 (whether it worked with or without errors) are unknown and could be a whole set of objects in the new directory, in step 110" a new instance of the decompression function "Uncompress Files in Directory" is invoked to decompress all compressed files in the new directory. At this point the original instance of the decompression function (in step 110) is waiting on the new instance of the decompression function that has been invoked in step 110" to finish. When the new instance of the decompression function (step 110") ends, it will return back to the instance of the decompression function that called it, and the process continues with step 204, where the next object found in the original directory will be examined and the process continues with step 208, as described herein above.

For example, the decompression function (step 110) is called to decompress all compressed files in a directory, for instance, "Directory A". As such Directory A is examined and, for instance, an object 1 in Directory A is found in step 208 to be a file (file 1), which file 1 is further determined in step 214 to be a compressed file. Accordingly, in step 216 a new directory, Directory B, is created to uncompress file 1 into. File 1 (object 1) is decompressed or uncompressed in step 218 into Directory B. The uncompression or decompression of file 1 could create many files and many subdirectories within Directory B. If file 1 decompresses without errors in step 220, file 1 is deleted in step 222 and no longer exists in Directory A. Further, in step 110", a new instance of the decompression function "Uncompress Files in Directory" is invoked or called to uncompress or decompress any compressed files contained in Directory B and any sub-directories. The decompression function (in step 110") runs and runs until all the compressed files in Directory B and any subdirectories are decompressed and when it is done it returns to the calling program which is the copy of the decompression function (step 110) that is decompressing the compressed files in Directory A. It will then continue on looking at the next object in Directory A. If there are more objects in Directory A, the next object, for instance, object 2, is examined in Directory A. Accordingly, in this example, there were at least two copies or instances of the decompression function running at once. When Directory B is being processed more copies or instances of the decompression function could be invoked at once. As such, the decompression function call in step 110" ends when all the compressed files in the new directory (Directory B) are decompressed (baring errors). The original instance of the decompression function (step 110) running examines the next object found in the original directory (Directory A-object 2). Further, steps 204 and 208 are repeated or iterated through the original directory (Directory A) to determine if there are more objects in the directory (Directory A) to process and then examines the next object.

Accordingly, given the possibility that a decompression tool may be capable of handling compressed file types that a virus scanner or virus scanning tool may not be able to handle, the invention provides a mechanism to preprocess the compressed files in order to maximize the virus test coverage. Further, by not deleting the compressed files that the decompression tool had an error with, the invention uses the capability of the virus scanning tool to scan into certain compressed files as if they were decompressed or uncompressed. So in addition to the virus scanning tool being able to scan a file, it may be able to virus check contents of some compressed files. Thus, the invention maximizes virus check coverage by utilizing the combined capability of both the decompression and the virus scanning tools and minimizes redundancy during virus checking of a directory, given that any compressed file that has been fully decompressed by the decompression tool without any errors is deleted from the directory.

Figure 3:
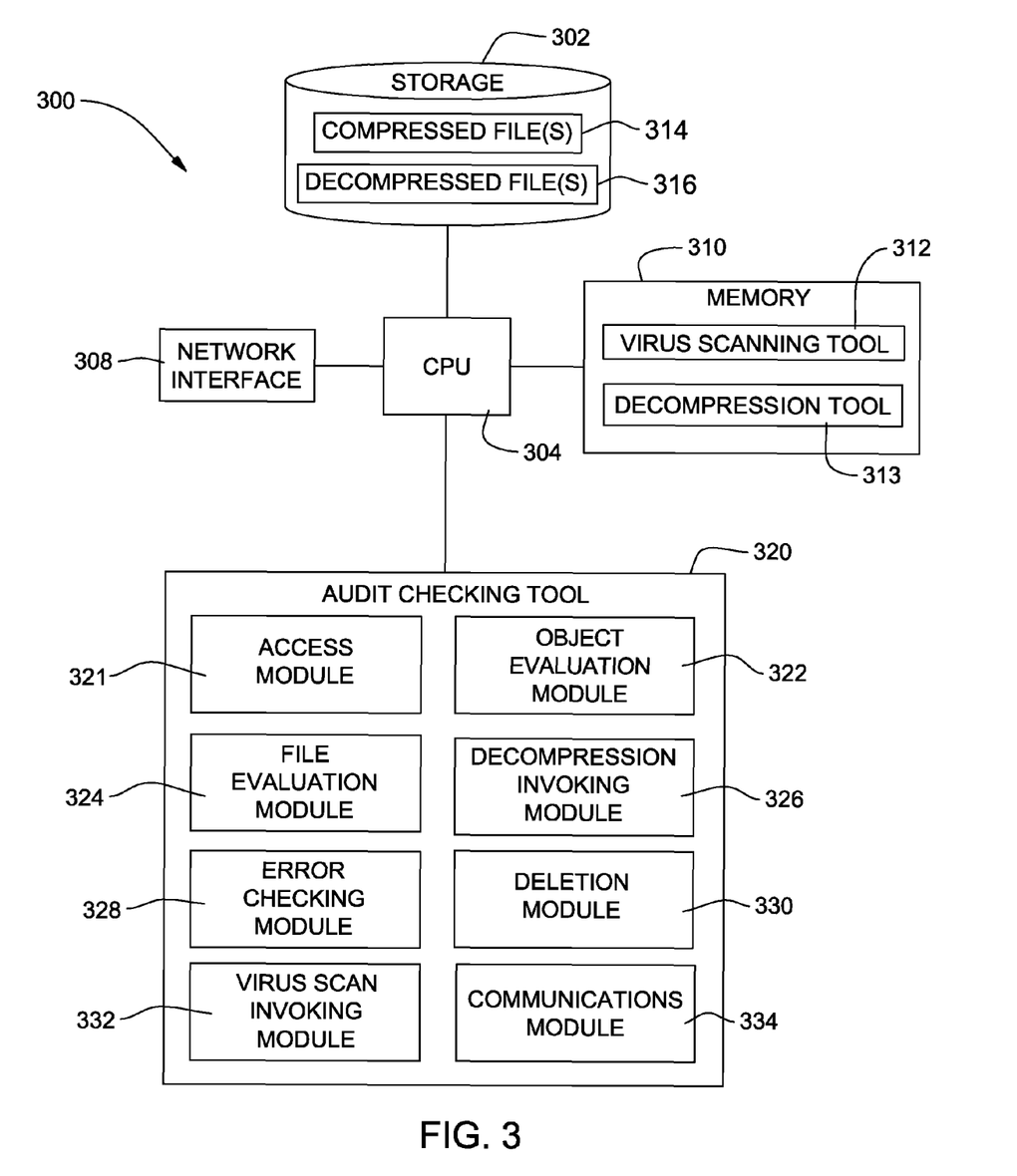
FIG. 3 is a schematic block system diagram illustrating an embodiment of a system for maximizing coverage while minimizing redundancy in virus checking of files, in accordance with an embodiment of the present invention.

Reference is now made to FIG. 3, which illustrates an embodiment of a system for maximizing virus check coverage while minimizing redundancy when virus checking compressed files in a directory, in accordance with an embodiment of the present invention. Turning to FIG. 3, FIG. 3 is a schematic block system diagram illustrating one embodiment of a system or server 300 having an audit checking tool or code 320 deployed thereon, the audit checking tool or code 320 being configured to maximize virus check coverage while minimizing redundancy when virus checking compressed files in a directory, in accordance with an embodiment of the invention. Preferably, the system 300 is a server, for instance, an auditing server that has an audit checking tool 320 that is deployed and running thereon. Further, the auditing server 300 has installed in memory 310 a virus scanning tool 312, for instance, any commercially available virus scanning tool, preferably, a command line virus scanning tool that the audit checking tool 320 can invoke to virus check any file. Furthermore, the auditing server 300 has installed in memory 310 a decompression tool 313, for instance, any commercially available decompression tool, preferably, a command line decompression tool that the audit checking tool 320 can invoke to decompress or uncompress a compressed file. The auditing server or system 300 includes a central processing unit (CPU) 304, a local storage device 302, a network interface 308, and a memory 310. The CPU 304 is configured generally to execute operations within the system/server 300, such as, the audit checking tool or code 320. The network interface 308 is configured, in one embodiment, to facilitate network communications of the system 300 over a communications channel of a network (not shown in any of the drawings). In an embodiment, the local memory 310 is configured to store the virus scanning tool or program 312 that is invoked by the audit checking tool 320, as well as the decompression tool 313 that is invoked by the audit checking tool 320. Also, in an embodiment, the audit checking tool 320 is configured to store compressed file(s) 314 to be preprocessed in storage 302 in the auditing server 300. Further, in an embodiment, the audit checking tool 320 is configured to store uncompressed or decompressed file(s) 316 in storage 302 in the auditing server 300.

In one embodiment, as shown in FIG. 3, the audit checking tool or code 320 which runs on the auditing server or system 300 comprises a logic unit that contains a plurality of modules configured to functionally execute the necessary steps of maximizing virus check coverage while minimizing redundancy when virus checking compressed files in a directory. In particular, the audit checking tool or code 320 includes an access module 321, an object evaluation module 322, a file evaluation module 324, a decompression invoking module 326, an error checking module 328, a deletion module 330, a virus scan invoking module 332 and a communications module 334. The access module 321 is configured to access a file in a directory that is to be preprocessed with respect to virus checking and is configured to transfer the file into a working directory on the auditing server 300 in order to preprocess the file. The object evaluation module 322 of the audit checking tool or code 320 is configured to evaluate or preprocess whether or not an object in the working directory is a file or a directory. The file evaluation module 324 is configured to examine whether or not a file is compressed. The decompression invoking module 326 is configured to invoke the decompression tool 313 for decompressing a compressed file. Further, the error checking module 328 is configured to check for any errors associated with the decompression of a compressed file by the decompression tool. In particular, the error checking module 328 is configured to set forth whether or not a compressed file has been fully or completely decompressed by the decompression tool 313, so that the deletion module 330 can determine whether or not to delete the compressed file. The deletion module 330 is configured to delete a compressed file if the compressed file has been fully or completely decompressed, that is, the decompression tool cannot decompress the compressed file any further. The virus scan invoking module 332 is configured to invoke the virus scanning tool for virus checking all the files and/or directories that have been preprocessed by the audit checking tool 320, using the decompression tool. Further, the communications module 334 is configured to permit communication between the various modules of the audit checking tool or code 320 and other various components, such as, communication the results of the decompression of a compressed file by the decompression tool 313 and/or the results of a virus check performed by the virus scanning tool 312.

Figure 4:
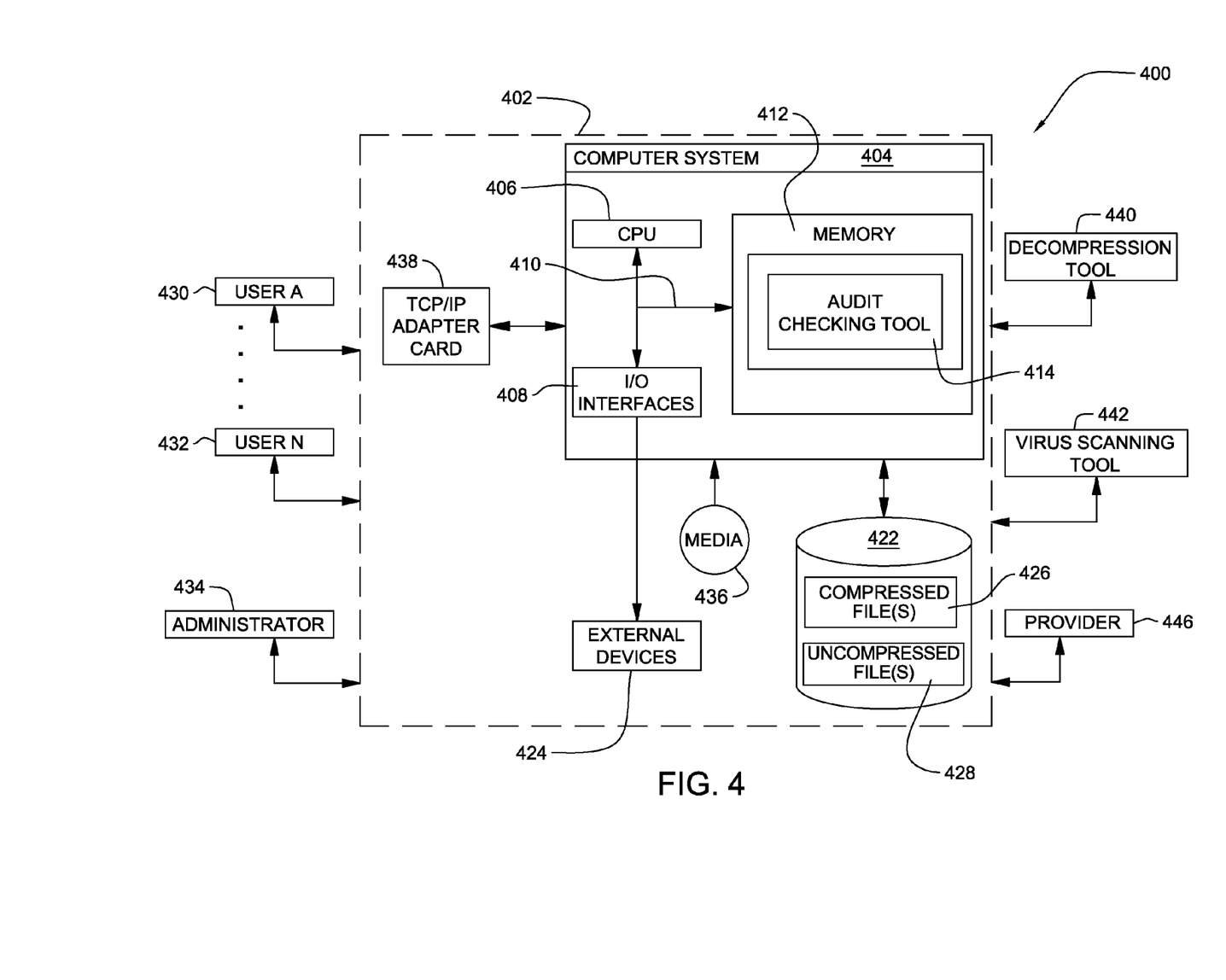
FIG. 4 is a schematic block system diagram illustrating an embodiment of a computer infrastructure for maximizing coverage while minimizing redundancy in virus checking of files, in accordance with an embodiment of the present invention.

Referring now to FIG. 4, there is illustrated a system 400 that provides a computer program product for maximizing virus check coverage while minimizing redundancy when virus checking compressed files in a directory, in accordance with an embodiment of the present invention. The computer program product comprises a computer readable or computer-usable medium, which provides program code, namely, the audit checking tool 414, for use by or in connection with a computer or any instruction execution system. The audit checking tool or program 414 can be loaded into computer system 404 from a computer readable media 436, such as, a magnetic tape or disk, optical media, DVD, memory stick, semiconductor memory, etc. or downloaded from the Internet via a TCP/IP adapter card 438. As depicted in FIG. 4, system 400 includes a computer infrastructure 402, which is intended to represent any type of computer architecture that is maintained in a secure environment (i.e., for which access control is enforced). As shown, infrastructure 402 includes a computer system 404 that typically represents an auditing server or system 404 or the like that includes an audit checking tool or program 414 configured to maximize virus check coverage while minimizing redundancy when virus checking compressed files in a directory. It should be understood, however, that although not shown, other hardware and software components (e.g., additional computer systems, routers, firewalls, etc.) could be included in infrastructure 402.

In general, user A (reference numeral 430) through user N (reference numeral 432) may access the auditing server or system 404, which has deployed thereon the audit checking tool 414, which implements the invention. The audit checking tool or program 414 is run on the server 404 to preprocess files in a directory in order to maximize virus check coverage while minimizing redundancy when virus checking compressed files in the directory. The auditing server or system 404 is configured to invoke the decompression tool 440 for decompressing or uncompressing any compressed file found in a directory that is to be virus checked. Further, the audit checking tool 414 is configured to invoke the virus scanning tool 442 for virus checking all files and directories that have been preprocessed by the audit checking tool 414. It is understood that although the virus scanning tool 442 and the decompression tool 440 are shown as being external to system 404, the decompression tool 440 and the virus scanning tool 442 can be stored in local memory 412 within system 404.

As shown in FIG. 4, the auditing server or system 404 (which has implemented thereon the audit checking tool 414) is shown in communication with a general storage or file system 422, which stores the compressed file(s) 426 and uncompressed or decompressed file(s) 428. In particular, a user (user A, reference numeral 430 through user N, reference numeral 432) accesses the auditing server or system 404 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 402 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 402. It should be understood that under the present invention, infrastructure 402 could be owned and/or operated by a party such as provider 446, or by an independent entity. Regardless, use of infrastructure 402 and the teachings described herein could be offered to the parties on a subscription or fee-basis. In either scenario, an administrator 434 could support and configure infrastructure 402, for instance, upgrading the audit checking tool 414 in the auditing server or system 404.

The auditing system or server 404 is shown to include a CPU (hereinafter "processing unit 406"), a memory 412, a bus 410, and input/output (I/O) interfaces 408. Further, the server 404 is shown in communication with external I/O devices/resources 424 and file system 422. In general, processing unit 406 executes computer program code, such as the audit checking tool 414. While executing computer program code, the processing unit 406 can read and/or write data to/from memory 412, file system 422, and/or I/O interfaces 408. For instance, in one embodiment, the audit checking tool 414 stores a copy of any compressed file(s) 426 in a working directory in storage 422. Similarly, the audit checking tool 414 stores any uncompressed or decompressed file(s) 428 that were uncompressed or decompressed using the decompression tool 440 in a new directory in storage 422. Alternatively, the compressed file(s) 426 and uncompressed file(s) 428 may be stored in a separate storage within the system 404. Bus 410 provides a communication link between each of the components in computer system 400, such that information can be communicated within the infrastructure 402. External devices 424 can comprise any devices (e.g., keyboard, pointing device, display, etc.) that enable a user to interact with computer system 400 and/or any devices (e.g., network card, modem, etc.) that enable server 404 to communicate with one or more other computing devices.

Computer infrastructure 402 is only illustrative of various types of computer infrastructures for implementing the invention. For example, in an embodiment shown, computer infrastructure 402 comprises two or more computing devices (e.g., a server cluster) that communicate over a network to perform the various process steps of the invention. Moreover, computer system 400 is only representative of various possible computer systems that can include numerous combinations of hardware. To this extent, in other embodiments, computer system 400 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 406 may comprise a single processing unit, or be distributed across one or more processing units in one or more locations, e.g., on a client and server. Similarly, memory 412 and/or file system 422 can comprise any combination of various types of data storage and/or transmission media that reside at one or more physical locations. Further, I/O interfaces 408 can comprise any system for exchanging information with one or more external devices 424. Still further, it is understood that one or more additional components (e.g., system software, math co-processing unit, etc.) not shown in FIG. 4 can be included in computer system 400. However, if computer system 400 comprises a handheld device or the like, it is understood that one or more external devices 424 (e.g., a display) and/or file system(s) 422 could be contained within computer system 404, and not externally as shown. File system 422 can be any type of system (e.g., a database) capable of providing storage for information under the present invention, such as the files to be preprocessed by the audit checking tool 414. To this extent, file system 422 could include one or more storage devices, such as a magnetic disk drive or an optical disk drive. In another embodiment, file system 422 includes data distributed across, for example, a local area network (LAN), wide area network (WAN) or a storage area network (SAN) (not shown). Although not shown, additional components, such as cache memory, communication systems, system software, etc., may be incorporated into computer system 400.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of virus checking, said method comprising the steps of:
   a computer system determining whether or not a file in a directory to be virus checked is a compressed file, and if so, the computer system decompressing the compressed file;
   the computer system iterating the determining and decompressing steps to decompress any other files contained therein, wherein the iterating step further comprises the steps of:
      the computer system establishing whether an object in the file in the directory is another file or another directory;
      if the object is established to be the another directory, the computer system invoking a decompression tool to decompress the another directory in the directory;
      if the object is established to be the another file, the computer system determining whether or not the another file is another compressed file;
      if the another file is determined to be the another compressed file, the computer system invoking the decompression tool to decompress the another compressed file in a new directory;
the computer system virus checking the directory, wherein the virus checking does not virus check a respective compressed file that is not fully decompressed without any errors; and
the computer system deleting the respective compressed file that is fully decompressed without the any errors from the directory.

2. The method according to claim 1, wherein the determining step further comprises the step of:
the computer system providing an audit checking tool for determining whether each file in the directory to be virus checked is the compressed file.

3. The method according to claim 2, wherein the decompressing step further comprises the steps of:
the computer system creating a new directory for decompressing the compressed file; and
the computer system providing a decompression tool for decompressing the compressed file.

4. The method according to claim 3, wherein the decompressing step further comprises the step of:
the computer system invoking the decompression tool for decompressing the compressed file into the new directory.

5. The method according to claim 1, wherein the deleting step further comprises the steps of:
the computer system determining whether or not the any errors associated with decompressing the respective compressed file that is fully decompressed by the decompression tool are present;
if the any errors are not present, the computer system deleting the respective compressed file that is fully decompressed from the directory; and
if the any errors are present, the computer system saving the respective compressed file in the directory.

6. The method according to claim 5, wherein the virus checking step further comprises the step of:
the computer system invoking a virus scanning tool to virus check all files in the directory, the directory comprising the new directory.

7. The method of claim 1 further comprising:
the computer system creating the directory; and
the computer system copying files to the directory prior to the computer system determining whether or not the file in the directory to be virus checked is the compressed file and if the file is the compressed file, the computer system decompressing the compressed file.

8. A computer system for virus checking of compressed files in a directory comprising:
a CPU, a computer readable storage device, and a computer readable memory;
first program code for a decompression tool configured to decompress a file in the directory into a new directory with 0 to N compressed files contained within the file in the directory, the new directory being a subset of the directory;
second program code for an audit checking tool configured to recursively preprocess the file in the directory using the decompression tool to decompress the 0 to N compressed files in the new directory; establish whether an object in the directory is another file or another directory; if the object is established to be the another directory, invoke the decompression tool to decompress the another directory in the directory; if the object is established to be the another file, determine whether or not the another file is compressed; if the another file is determined to be compressed, invoke the decompression tool to decompress the another file into the new directory; determine whether or not any errors associated with decompressing by the decompression tool in a respective compressed file are present; and delete the respective compressed file from the directory if the any errors are not present; and
third program code for a virus scanning tool configured to virus check the directory that has been recursively preprocessed by the audit checking tool using the decompression tool to decompress the 0 to N compressed files, wherein the virus checking of the respective compressed file that has been fully decompressed by the decompression tool without the any errors is precluded, wherein the first program code, the second program code, and the third program code are stored in the computer readable storage device for execution by the CPU via the computer readable memory.

9. The computer system according to claim 8, wherein the audit checking tool is further configured to save the respective compressed file in the directory if it is ascertained that there are errors associated with decompressing the respective compressed file.

10. The computer system according to claim 9, wherein the virus scanning tool is further configured to virus check all files in the directory, the directory comprising the new directory.

11. The computer system of claim 8, wherein the second program code further includes program code for the audit checking tool to delete the respective compressed file among the 0 to N compressed files that has been fully decompressed by the decompression tool without the any errors.

12. A computer program product for maximizing virus check coverage while minimizing redundancy in virus checking, said computer program product comprising:
a computer readable storage device;
first program instructions to run an audit check tool to determine whether or not a file in a directory to be preprocessed for virus checking is a compressed file; establish whether an object in the file in the directory is another file or another directory; if the object is established to be the another directory, invoke a decompression tool to decompress any files contained within the another directory in the directory; if the object is established to be the another file, determine whether or not the another file is another compressed file; and if the another file is determined to be the another compressed file, invoke the decompression tool to decompress the another compressed file in a new directory;
second program instructions to recursively preprocess the compressed file by invoking the decompression tool to decompress the compressed file, including any other compressed files contained therein; and
third program instructions to virus check the directory after the compressed file has been recursively preprocessed using the decompression tool, wherein a virus scanning tool does not virus check a respective compressed file that is not fully decompressed without any errors in the directory; and wherein the first, the second, and the third program instructions are stored on the computer readable storage device.

13. The computer program product according to claim 12, wherein the second program instructions further comprise instructions to determine whether or not the any errors associated with the respective compressed file being fully decompressed by the decompression tool are present; if the any errors are not present, deleting the respective compressed file from the directory and, if the any errors are ascertained, saving the respective compressed file in the directory.

14. The computer program product according to claim 12, wherein the third program instructions further comprise instructions to virus check all files in the directory, the directory comprising the new directory.

* * * * *